(12) United States Patent
Süßenbach (10) Patent No.: US 7,658,581 B2
(45) Date of Patent: Feb. 9, 2010

(54) JOINING ASSEMBLY INCLUDING A PLASTIC SUPPORT MEMBER AND A PLASTIC THREADED ELEMENT

(75) Inventor: Rainer Süßenbach, Steinhagen (DE)

(73) Assignee: Bollhoff Verbindungstechnik GmbH, Beilefeld (DE)

( * ) Notice: Subject to any disclaimer, the term of this patent is extended or adjusted under 35 U.S.C. 154(b) by 230 days.

(21) Appl. No.: 11/119,247

(22) Filed: Apr. 29, 2005

(65) Prior Publication Data

US 2005/0244249 A1   Nov. 3, 2005

(30) Foreign Application Priority Data

Apr. 30, 2004   (DE) .................. 10 2004 021 484

(51) Int. Cl.
*F16B 35/04* (2006.01)
*F16B 25/00* (2006.01)
*F16B 39/30* (2006.01)

(52) U.S. Cl. ................. 411/411; 411/908; 411/413; 411/415; 411/311; 411/386

(58) Field of Classification Search ......... 411/411–416, 411/386–387.8, 418, 311, 908
See application file for complete search history.

(56) References Cited

U.S. PATENT DOCUMENTS

| | | | | |
|---|---|---|---|---|
| 2,263,424 A | * | 11/1941 | Langer | 411/411 |
| 3,426,820 A | * | 2/1969 | Phipard, Jr. | 411/310 |
| 4,527,932 A | * | 7/1985 | Onasch et al. | 411/411 |
| 4,534,690 A | | 8/1985 | Barth | |
| 4,668,191 A | * | 5/1987 | Plischka | 433/174 |
| 4,673,323 A | * | 6/1987 | Russo | 411/107 |
| 4,776,737 A | * | 10/1988 | Wollar | 411/38 |
| 4,943,094 A | * | 7/1990 | Simmons | 285/333 |
| 5,156,616 A | * | 10/1992 | Meadows et al. | 606/232 |
| 5,252,016 A | * | 10/1993 | Schmid et al. | 411/386 |
| 5,413,445 A | * | 5/1995 | Cartellone | 411/400 |
| 5,544,993 A | * | 8/1996 | Harle | 411/414 |
| 6,135,689 A | * | 10/2000 | Matsunami | 411/311 |
| 6,283,973 B1 | * | 9/2001 | Hubbard et al. | 606/104 |
| 6,371,709 B1 | | 4/2002 | Papafotiou et al. | |
| 6,561,741 B2 | * | 5/2003 | Garver | 411/386 |

(Continued)

FOREIGN PATENT DOCUMENTS

DE   23 17 736 A1   4/1973

(Continued)

OTHER PUBLICATIONS

ICS Handbuch, Automatische Schraubmontage. ISBN 3-922885-64-0; 7, 8, S.115-121, S.93-95, S.241-243, S.244-245.

*Primary Examiner*—Victor Batson
*Assistant Examiner*—David C Reese
(74) *Attorney, Agent, or Firm*—Seyfarth Shaw LLP (57) ABSTRACT

A threaded element of plastic material for a joining assembly has a uniquely formed thread profile of a small profile angle between 30° and 50° and a rounded crest of a relatively large radius of curvature. The gap between the revolutions of the thread is of a volume which exceeds that of the thread. In order to provide for a specific cutting geometry of the thread profile the threaded element comprises a plurality of angular segments which are radially offset with respect to each other such that adjacent angular segments provide cutting edges. Furthermore, a tool and a method for making such a joining assembly are disclosed.

26 Claims, 6 Drawing Sheets

U.S. PATENT DOCUMENTS

| | | | |
|---|---|---|---|
| 6,672,813 B1 * | 1/2004 | Kajita et al. | 411/411 |
| 7,160,073 B2 * | 1/2007 | Mizuno et al. | 411/387.4 |
| 2002/0136616 A1 * | 9/2002 | Birkelbach | 411/411 |
| 2002/0192051 A1 * | 12/2002 | LeVey et al. | 411/411 |
| 2003/0143058 A1 * | 7/2003 | Takahashi et al. | 411/387.4 |
| 2003/0156921 A1 * | 8/2003 | Nagawa et al. | 411/411 |
| 2005/0019129 A1 * | 1/2005 | Hesse et al. | 411/36 |
| 2005/0079031 A1 * | 4/2005 | Mizuno et al. | 411/387.4 |

FOREIGN PATENT DOCUMENTS

| | | |
|---|---|---|
| DE | 24 57 683 A1 | 6/1976 |
| DE | 27 54 870 C3 | 6/1979 |
| DE | 28 11 747 C2 | 9/1979 |
| DE | 32 01 846 A1 | 9/1982 |
| DE | 83 03 394 U1 | 5/1983 |
| DE | 3336277 | 5/1983 |
| DE | 32 35 352 A1 | 3/1984 |
| DE | 35 30 083 C2 | 3/1987 |
| DE | 91 15 162 U1 | 7/1992 |
| DE | 4206884 | 9/1993 |
| DE | 42 27 272 A1 | 2/1994 |
| DE | 42 27 274 C2 | 4/1994 |
| DE | 690 06 170 T2 | 5/1994 |
| DE | 195 08 454 A1 | 9/1996 |
| DE | 195 08 921 A1 | 9/1996 |
| DE | 295 08 852 U1 | 11/1996 |
| DE | 197 49 845 A1 | 5/1999 |
| DE | 198 60 085 A1 | 6/2000 |
| DE | 199 27 431 A1 | 12/2000 |
| DE | 203 07 622 U1 | 9/2003 |
| EP | 1193404 | 8/1989 |
| EP | 05 57 292 B1 | 10/1991 |
| EP | 05 16 430 A1 | 5/1992 |
| EP | 06 60 004 A1 | 12/1994 |
| EP | 11 60 071 A2 | 12/2001 |
| EP | 13 50 966 A1 | 10/2003 |
| GB | 14 82 624 | 8/1977 |
| GB | 2028950 A * | 3/1980 |
| JP | 49 356 | 1/1974 |
| JP | 60-116913 | 6/1985 |
| JP | 61-50816 | 4/1986 |
| JP | 10-246215 | 9/1998 |
| JP | 11-270530 | 10/1999 |
| JP | 11325019 A | 11/1999 |
| JP | 2002-257120 | 9/2002 |
| JP | 2002-323031 | 11/2002 |
| WO | WO 9404834 | 3/1994 |
| WO | WO01/01001 | 1/2001 |

* cited by examiner

JOINING ASSEMBLY INCLUDING A PLASTIC SUPPORT MEMBER AND A PLASTIC THREADED ELEMENT

BACKGROUND OF THE INVENTION

The present invention relates to a joining assembly including a support member of plastic material and a threaded element of plastic material. The threaded element is threaded into a receiving bore of the support member and comprises a core and an external thread which when threaded into the receiving bore of the support member forms a counter-thread in the receiving bore of the support member. Furthermore, the present invention relates to a threaded element formed as a screw or a threaded sleeve for such a joining assembly, and a tool and method for making a joining assembly.

Such joining assemblies comprising a plastic support member and a plastic threaded element formed as a screw or a threaded sleeve with a self-tapping external thread have become known, see for example DE 42 27 272 A1, DE 42 27 274 C2, and DE 23 17 736. The threaded elements of these joining assemblies generally are provided with a specifically designed thread profile so as to enable them to perform their self-tapping function.

For example DE 42 27 272 A1 discloses a threaded element with a so-called round profile, wherein the thread in an axial cross-section is of a circular profile, the revolutions of the thread being spaced from each other, in an axial direction, by small gaps. DE 42 27 274 C2 discloses a threaded sleeve having an external thread of a height which increases from a minimal value to a maximal value in the threading direction so as to provide, at the maximal value of the thread height, a step intended to act as a disengagement lock. The thread is formed as a "triangular thread" in this case.

DE 32 01 846 A1 and DE 91 15 162 U1 disclose self-tapping threaded elements having threads of a profile specially designed to perform the self-tapping function. However, these threaded elements are not made of plastic material.

DE 23 17 736 discloses a self-tapping screw or bolt of plastic material which includes longitudinally extending grooves for providing a pair of diametrically opposite cutting edges in each thread revolution, which cutting edges act in the threading operation to cut an internal thread into the receiving bore of the support member when the screw or bolt is threaded into the receiving bore.

While self-tapping threaded elements of plastic material are being used in practice, further improvements are desirable. One drawback of the prior art threaded elements of plastic material is that they are generally suited only for support members of one specific plastic material while they are not suited for a great number of other plastic materials. Quite often the self-tapping qualities of the threaded element are poor. The strength and load capability of the threaded element and of the joining assembly may be detrimentally affected by notching and/or clamping effects during forming of the thread. Furthermore, deformation resistance and stability of the threaded element are not always satisfactory. Finally, even for small threading torques maximal security against inadvertent disengagement of the threaded element from the receiving bore of the support member should be ensured.

SUMMARY OF THE INVENTION

The above disadvantages and drawbacks of the prior art are to be overcome by the present invention. More particularly, it is a primary object of the present invention to provide a joining assembly, a threaded element formed as a screw or threaded sleeve, and a tool and method for making such a joining assembly which allow optimization of the joining assembly and its threaded element with respect to thread forming, mechanical strength, loading capability, deformation resistance, and safety against inadvertent disengagement.

According to one aspect of the present invention, the external thread of the threaded element is of a special thread profile as defined in claim 1, while special embodiments of this profile have been defined in claims 2 to 6. As defined in claims 7 and 8, the external threaded portion may be formed as a fine thread or as a multi-lead thread.

According to another aspect of the invention, the external thread of the threaded element is of a special cutting geometry as defined in claim 9. Specific embodiments of the cutting geometry have been defined in claims 10 to 14. Further details of the external thread of the threaded element have been defined in claims 15 to 17.

Preferably, the threaded element has a free end provided with a special tip area as defined in claims 18 to 22.

When the threaded element is a screw or bolt, the transition area between the shaft and the head thereof is designed in a special manner as defined in claims 23 to 27.

As an alternative the threaded element may be a threaded sleeve as defined in claims 28 and 29. A special tool as defined in claims 32 and 33 is preferably used to thread the threaded sleeve into the receiving bore of the support member.

According to a further aspect of the present invention the plastic materials of the threaded element on the one hand and the support member on the other hand are adapted to each other and selected such as defined in claims 30 and 31.

A method for making a specially designed joining assembly has been defined in claims 36 and 37.

As should be self-evident from the above, the present invention relates, additionally to the joining assembly and the tool and method for making the joining assembly, to the threaded element itself which may be a screw (bolt) or a threaded sleeve as defined in claims 34 and 35.

BRIEF DESCRIPTION OF THE DRAWINGS

Further features and details of the present invention will be described in the following with reference to the accompanying drawings. In the drawings.

DETAILED DESCRIPTION OF THE DRAWINGS

Figure 1:
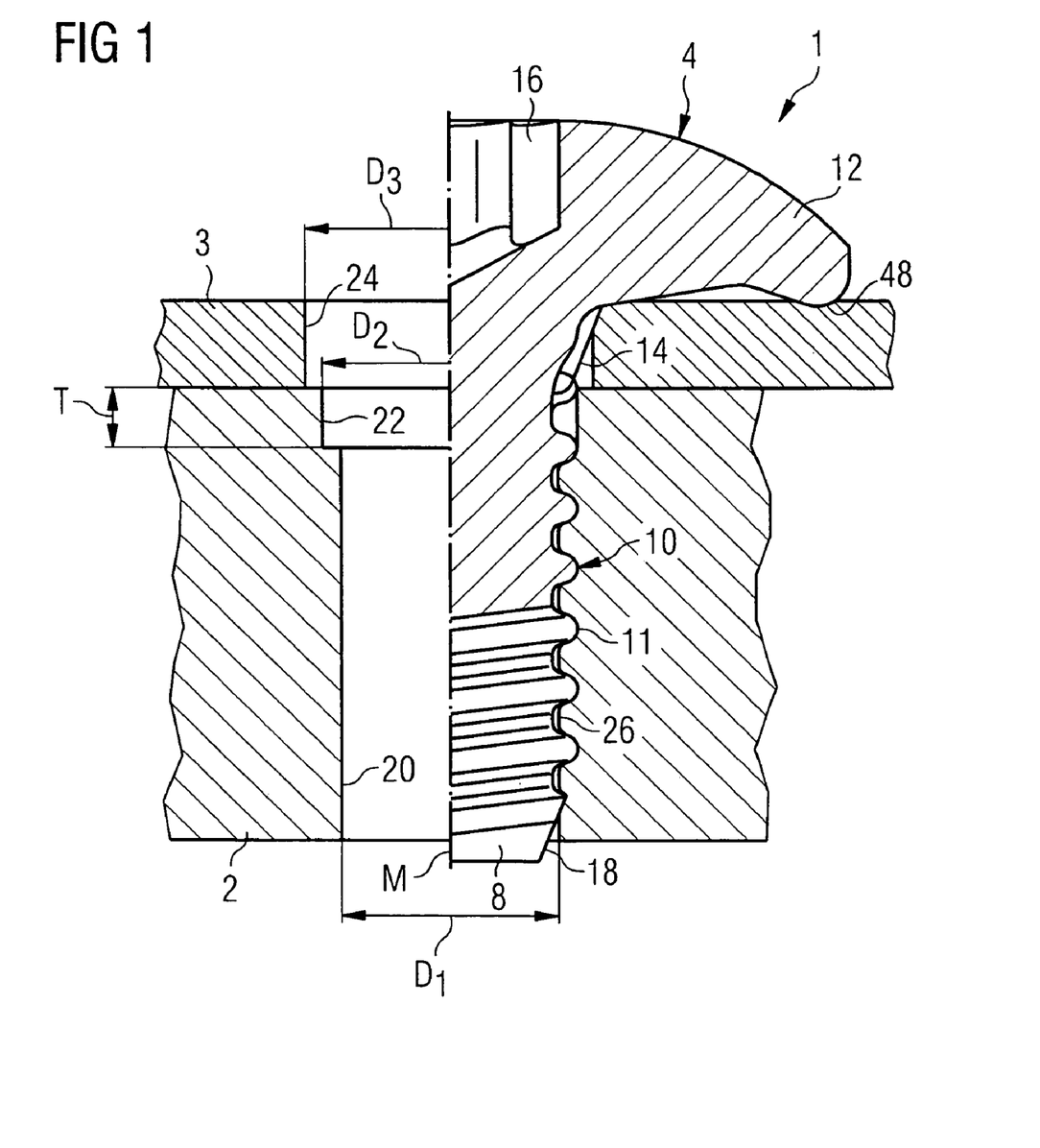
FIG. 1 is a cross-section of a joining assembly with one half of a threaded element formed as a screw.
Figure 2:
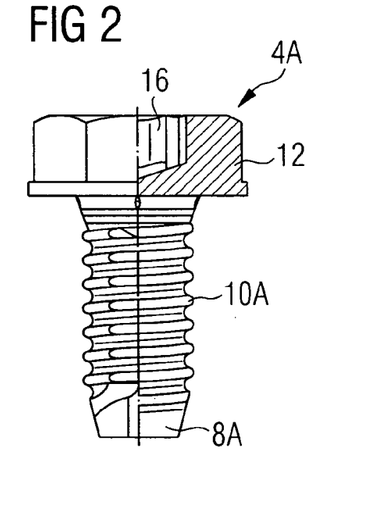
FIG. 2 is a side elevation, partially in section, of a screw of the present invention.
Figure 3:
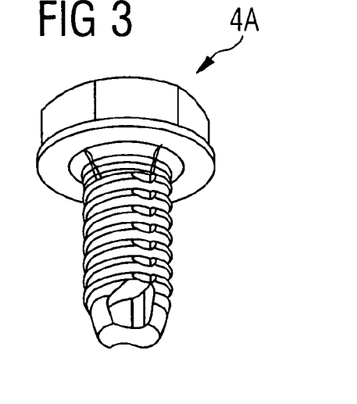
FIG. 3 is a perspective view of the screw in FIG. 2.
Figure 4:
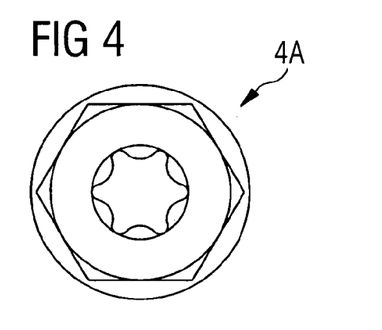
FIG. 4 is an end view of the screw in FIG. 2.
Figure 5:
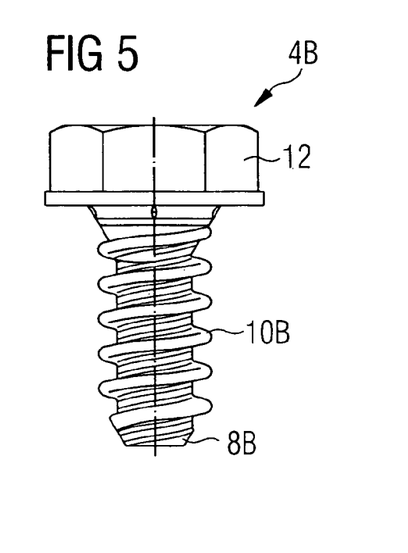
FIG. 5 is a view, similar to FIG. 2, of another embodiment of a screw of the present invention.
Figure 6:
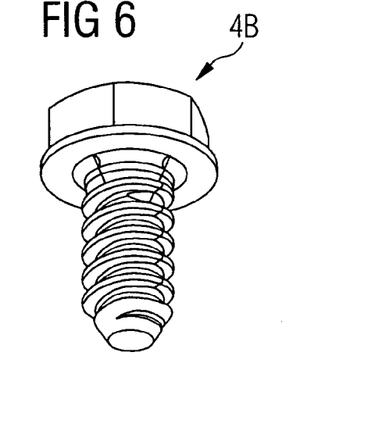
FIG. 6 is a perspective view of the screw in FIG. 5.

FIG. 1 shows a joining assembly 1 including a support member 2 of plastic material and a threaded element formed as a screw or bolt 4 which is also of plastic material. In the embodiment as shown, the joining assembly 1 is a threaded joint wherein the screw or bolt 4 provides for a clamping connection between the support member 2 and a further structural member 3. If, however, the threaded element is a threaded sleeve 6 (FIGS. 7 to 12), the joining assembly consists only of the threaded sleeve 6 and the support member 2.

The screw or bolt 4 comprises a shaft including a solid core 8 and an external threaded portion 10 comprising a single thread 11, a head 12, a transition area 14 between the shaft and the head 12, a drive means 16, and a tip area 18 at the end of the core 8 remote from the head 12.

FIG. 1 shows the joining assembly on the left-hand side before the screw 4 is threaded into a receiving bore 20 of the support member 2 and on the right-hand side after the screw 4 has been threaded into the receiving bore 20. As shown, the receiving bore 20 is of a smooth cylindrical shape before the screw 4 is threaded thereinto. The thread 11 of the screw 4 is designed such that it is self-tapping or thread-forming so that the thread 11 when the screw 4 is threaded into the receiving bore 20 forms an internal thread 26 in the receiving bore 20 as will be explained in more detail below.

Furthermore, as may be seen in FIG. 1, the support member 2 has a counter-bore 22 the diameter $D_2$ of which slightly exceeds the diameter $D_1$ of the receiving bore 20 and is substantially similar to the major diameter of the external thread 11. The structural member 3 has a thru-bore 24 of a diameter $D_3$ which slightly exceeds the diameters $D_1$ and $D_2$.

The screws 4A and 4B shown in FIGS. 2 to 6 differ from the screw in FIG. 1 only in respect of their heads which, for screws 4A and 4B, are multi-functional heads having external and internal drive means 16. The drive means may be of any type and structure. In the embodiment as shown the external drive means is a hexagon with flange abutment, while the internal drive means is an internal radiussed hexagon; as an alternative it could be for example a cross-slot. The screws 4A and 4B differ from each other with respect to their thread profiles as will be explained in more detail below.

As already explained above, the present invention relates to various aspects of the joining assembly including the thread profile, the cutting geometry and the tip area of the screw or threaded sleeve, the transition area between the shaft and the head of the screw, the material of the screw or threaded sleeve and of the support member, a tool for inserting the threaded sleeve into the support member, and a method for making the joining assembly. In the following these aspects of the present invention will be explained in more detail.

It is to be noted that the following comments relate both to the screw as well as to the threaded sleeve unless otherwise stated.

Thread Profile

The thread profile of the plastic screw and plastic threaded sleeve is designed, in accordance with the present invention, such that it forms the internal or counter-thread 26 in an optimal manner when the thread 11 penetrates into the receiving bore 20 of the support member 2. The internal thread 26 may be formed by a cutting operation (tapping operation) or by material deformation or by a combination of both operations.

The inventor has recognized that the thread profile of the threaded element to be used for support members of a material which substantially requires a cutting operation for forming the counter-thread should be of a somewhat different geometry than the thread profile of a threaded element to be used for support members of a material which requires substantially material deformation for forming the counter-thread. Therefore, in the preferred embodiments of the thread profile according to the present invention as shown in FIGS. 13 to 21, two different embodiments A and B are shown. The embodiment A is to be used in particular for hard, rigid materials which require primarily a cutting operation to have the thread penetrate into the material of the support member, while the embodiment B is to be used for highly extensible, impact resistant materials which require primarily material deformation for forming the counter-thread.

Nevertheless, the basic shape of the thread profile is the same for both embodiments A and B:

As shown in FIGS. 13 to 16, the external thread portions 10A and 10B each comprise a single thread 11 which extends about the core 8A and, respectively, 8B for a plurality of revolutions (turns). The thread 11, as shown in an axial cross-section, has a symmetrical profile which is defined by a pair of straight flanks 30 which are symmetrically disposed with respect to a radial line. The flanks 30 of the thread are joined by a rounded crest 31 of preferably circular curvature with a radius $R_1$.

The cores 8A and 8B each are provided with a cylindrical external surface 32 between the revolutions (turns) of the thread 11. The cylindrical external surface 32 is joined to the flanks 30 of the thread 11 each by a rounded corner 33 of preferably circular curvature. The axial spacing between the revolutions of the thread 11 is chosen such that the helical gap between the revolutions of the thread 11 is of a volume exceeding that of the thread.

The flanks 30 of the thread 11 are inclined with respect to each other by a profile angle α which is chosen to be relatively small for reasons explained below. The profile angle α should be in the range between 30° and 50° and is preferably about 40°.

The thread profile as described so far is similar for both embodiments A and B. There are differences with respect to the pitch P, the thread height Z and the radiusses R1 and R2 of rounded crest 31 and rounded corners 33.

With respect to the embodiment A of the thread profile the following ranges of values are preferred:

$P = (0.16 \text{ to } 0.9) \cdot D_A$
$Z = (0.15 \text{ to } 0.5) \cdot P$
$R1 = (0.4 \text{ to } 0.7) \cdot Z$
$R2 = (0.2 \text{ to } 0.5) \cdot Z$
$\alpha = 30° \text{ to } 50°$ Herein, P is the pitch of the thread, Z is the thread height, R1 is the radius of curvature of crest 31, R2 is the radius of curvature of the rounded corners 33 between the cylindrical external surface 32 of the core 8 and the flanks 30 of the thread 11, and D.sub.A is the major diameter of the thread 11 as shown in FIGS. 13 to 16.

Figure 13:
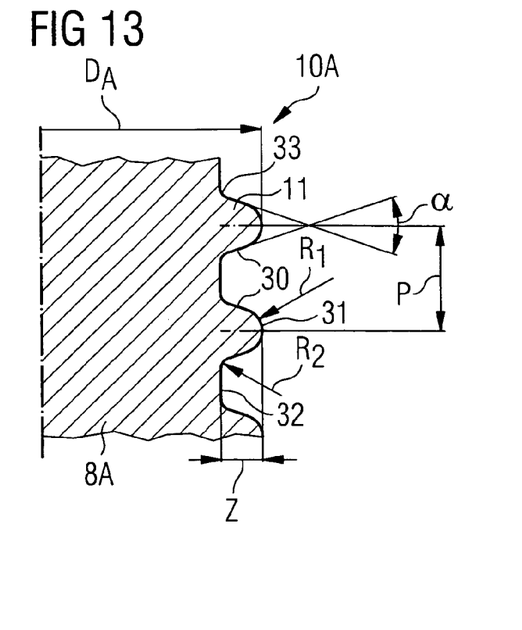
FIG. 13 is a sectional view of an embodiment A of the thread profile of a threaded element of the present invention.
Figure 14:
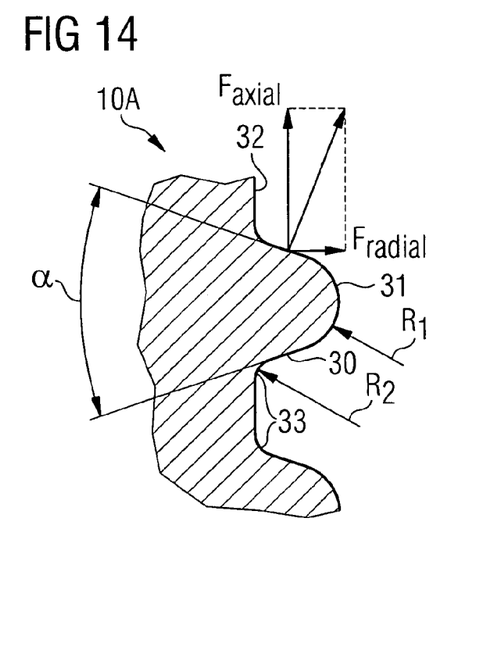
FIG. 14 is a sectional view of the thread profile in FIG. 13 at an enlarged scale.
Figure 15:
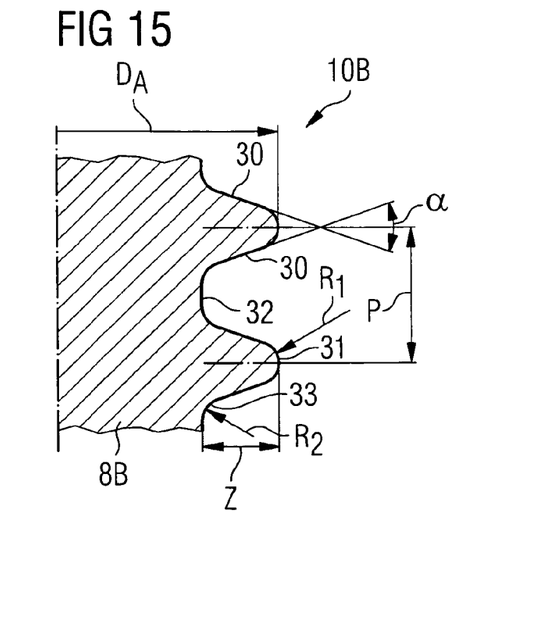
FIG. 15 is a sectional view similar to FIG. 13, of another embodiment B of the thread profile.
Figure 16:
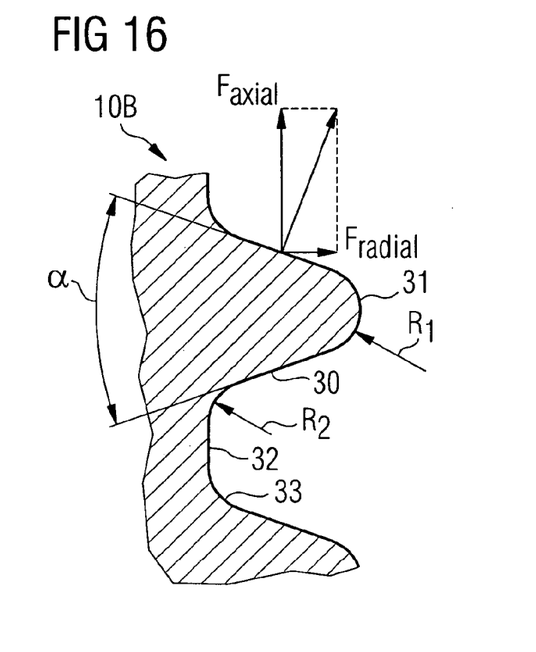
FIG. 16 is a sectional view, similar to FIG. 14, of the thread profile in FIG. 15.

With respect to the thread profile of embodiment A (FIGS. 13, 14) the following values are preferred:

$P = 0.25 \cdot D_A$
$Z = 0.38 \cdot Z$
$R1 = 0.6 \cdot Z$
$R2 = 0.35 \cdot Z$
$\alpha = 40°$ With respect to the thread profile of the embodiment B the following ranges are preferred:

$P = (0.25 \text{ to } 0.9) \cdot D_A$
$Z = (0.35 \text{ to } 0.65) \cdot P$
$R1 = (0.25 \text{ to } 0.5) \cdot Z$
$R2 = (0.25 \text{ to } 0.5) \cdot Z$
$\alpha = 30° \text{ to } 50°$ With respect to the thread profile of embodiment B (FIGS. 15, 16) the following values are preferred:

$P = 0.33 \cdot D_A$
$Z = 0.5 \cdot Z$
$R1 = 0.3 \cdot Z$
$R2 = 0.3 \cdot Z$
$\alpha = 40°$ Using a relatively small profile angle α provides for the advantage that the thread 11 when being threaded into the receiving bore 20 of the support member 2 exerts a relatively big axial force $F_{axial}$, however only a small radial force $F_{radial}$ upon the material of the support member 2. This—in combination with the relatively big radius R1 of crest 31—enables material of the support member 2 to penetrate into the gap between the revolutions of the thread 11 in an optimal manner, in particular without any detrimental notching and clamping effects, when the thread 11 forms the counter-thread 26. The fact that the volume of the gap between the revolutions of the thread 11 substantially exceeds the volume of the thread 11 prevents material of the support member 2 from engaging the cylindrical external surface 30 of the core 8A and, respectively, 8B, which otherwise would result in a detrimental clamping action. A further advantage of this dimensional relationship between the volumes of the gap and the thread is that a relatively substantial amount of material is present within the area of a virtual cylinder circumscribing the crest of the thread. When an axial tension force is exerted upon the joining assembly 1 (FIG. 1), the material of the support member within the virtual circumscribing cylincer is subjected to a shearing load. The increased volume and the favorable notching factor of the material of the support member in the shearing area provide for some kind of compensation of the reduced strength of the material of the support member as compared to the material of the plastic threaded element.

To summarize:

a) The relatively small radial force$_{radial}$ and the relatively big radius R1 ensure that the plastic threaded element can be threaded into the receiving bore 20 of the support member 2 with minimal notching effects and without any detrimental clamping action.

b) The relatively large gap between the revolutions of the thread 11 and the favorable notching factor provide for an optimal axial withdrawal resistance of the joining assembly 1.

The thread profile as shown in FIGS. 13 to 16 and having the above indicated preferred values may be used also in a fine thread (not shown). To this end it is merely necessary to increase the major diameter $D_A$ while maintaining the other preferred values of the thread profiles as shown and indicated above so that the pitch diameter ratio $P/D_A$ will be reduced accordingly.

The thread profile shown in FIGS. 13 to 16 has only a single thread. However, it is to be noted that the external thread portions 10A and 10B each could be formed as a multistart thread by increasing the pitch P up to values at the upper end of the preferred range of values (up to $0.9 \cdot D_A$). Even with such large values of the pitch, the pitch angle (lead angle) of the external thread portions 10A and 10B are still less than the self-locking angle of the two materials of the threaded element and support member. The multistart thread provides for the advantage that the threaded element—similar to a quick-connect closure—may be inserted into the receiving bore of the support member by only a few revolutions. The threaded element when having been released may be readily re-assembled; due to the self-locking action the screw or threaded sleeve will be securely engaged and retained within the receiving bore.

Cutting Geometry of the Thread Profile

In accordance with a further aspect of the present invention, the thread profiles of the embodiments A and B have their peripheries provided with cutting edges 36 and clearance angles β in order to facilitate penetration of the threaded element into the material of the support member. This cutting geometry of the thread profiles is shown in FIGS. 17 and 18.

Figure 17:
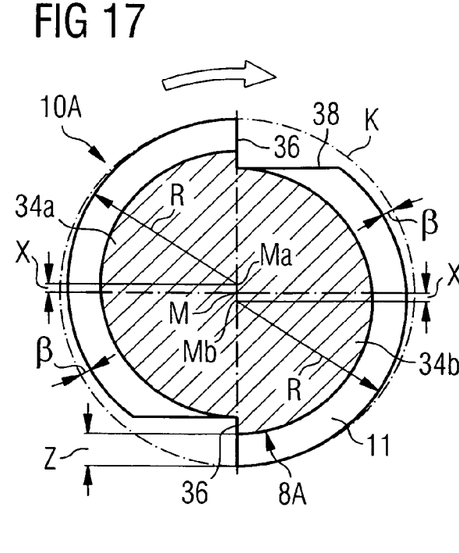
FIG. 17 is a cross-section of the embodiment A of a screw of the present invention for showing its cutting geometry.
Figure 18:
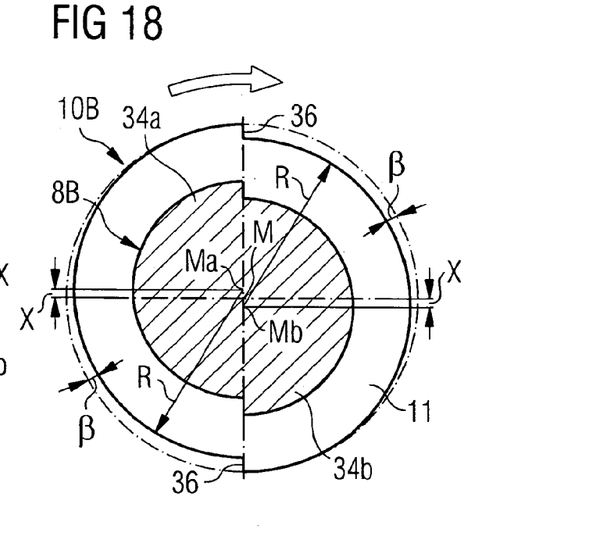
FIG. 18 is a cross-section similar to FIG. 17 of the embodiment B of a screw of the present invention.

For providing this cutting geometry the plastic screw (or threaded sleeve) is made of a plurality of angular segments; in the embodiments A and B of FIGS. 17 and 18 there are provided two angular segments 34a and 34b. The angular segments 34a and 34b have their threads 11 and their cores 8A and 8B each provided with peripheries of circular arc shape, with their centers of curvature Ma, Mb being offset with respect to the central axis M of the core 8A and, respectively, 8B for an amount X in opposite radial directions. As a result the angular segments 34a, 34b have the peripheries both of the core and the thread offset with respect to each other in a step-like manner so as to provide respective cutting edges 36. As indicated by the arrows in FIGS. 18 and 19, the cutting edges 36 are arranged such that they are effective in the threading direction in order to facilitate penetration of the thread into the material of the support member.

Furthermore, the radial offset of the angular segments 34a and 34b results in a clearance angle β between the external periphery of the thread and a virtual circumscribing circle K indicated by dash-dotted lines, along the periphery of the thread 11 and adjacent to a cutting edge 36. This clearance angle β provides for a sickel-shaped clearance which gradually increases from the respective cutting edge 36 in the threading direction.

The preferred values of the radial offset X are as follows:

$X = 0.10 \text{ mm for } D_{Nenn} \leqq 8 \text{ mm}$
$X = 0.15 \text{ mm for } D_{Nenn} > 8 \text{ mm and } D_{Nenn} \leqq 12 \text{ mm}$ X=0.20 mm for $D_{Nenn}>12$ mm The nominal diameter $D_{nenn}$ of the segments 34*a* and 34*b* is twice the radius R of the arcuate peripheries of the thread 11.

The above values of X provide for a clearance angle β of 1°. However, other values of the clearance angle are envisaged; preferably the clearance angle β is in a range between 0.5° and 5°, preferably between 0.5° and 2°.

For both embodiments A and B of the thread profile the same values of X and β may be used. However, a difference exists in that the embodiment A (FIG. 17) where forming of the counter-thread requires substantially a cutting operation includes a chip groove 38 which extends about the total length of the threaded element and is disposed adjacent the cutting edge 36 such that it elongates the cutting edge 36 correspondingly. The embodiment B (FIG. 18) where forming of the counter-thread requires substantially material deformation does not include a respective chip groove.

Figure 11:
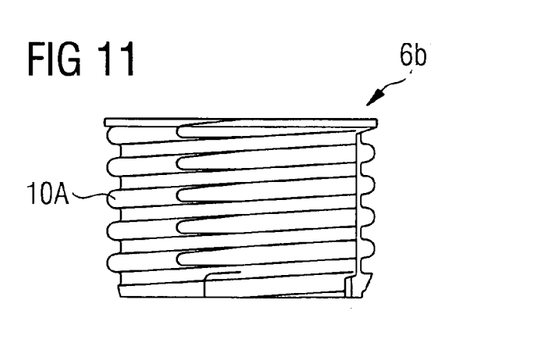
FIG. 11 is a side elevation of a further embodiment of a threaded sleeve of the present invention.

In the embodiments of the cutting geometry shown in FIGS. 17 and 18, the threaded element is composed of two radially offset angular segments. It is to be noted, however, that more than two angular segments could be provided, in particular for threaded elements of increased diameter. For example the threaded sleeve 6*b* shown in FIG. 11 is composed of four angular segments having four cutting edges 36 and four chip grooves 38.

The above described geometry of the thread profile, in particular the above described cutting geometry, provides on the one hand for a relatively small torque necessary for threading the threaded element into the receiving bore and on the other hand for a minimal risk of the threaded element being inadvertently released by rotation opposite to the threading direction.

For providing the above mentioned small torque requirement the cutting edges 36 generated by the radial offset of the angular segments 34*a* and 34*b* are most helpful. In the embodiments A and B shown in FIGS. 17 and 18, the cutting edges 36 are disposed in an axial plane which is the partition plane of injection molding halves when the threading element is made by injection molding. This ensures provision of sharp cutting edges.

The above mentioned minimal risk of the joining assembly 1 being inadvertently released results from a plurality of factors:

In contrast to conventional screw retention by tensioning and surface pressure of the screw, screw retention of the threaded element of plastic material results from relaxation of the plastic material of the support member in radially inwards directions about the thread profile. Of particular importance is the above mentioned radial offset of the angular segments 34*a* and 34*b* and the clearance angle β resulting therefrom. When the threaded element will have been threaded into the receiving bore of the support member, relaxation of the plastic material of the support member causes material of the support member to "flow" into the clearance gap between the periphery of the thread 11 and the virtual circumscribing circle K resulting from clearance angle β. This prevents the threaded element from rotating opposite to the threading direction and therefore provides for maximal safety against inadvertent release of the joining assembly 1. As tests have shown, release torque of the joining assembly 1 substantially exceeds the torque required for threading the threaded element into the receiving bore.

A further means which assists in preventing the joining assembly 1 from being inadvertently released is the self-locking action due to the above indicated values of the pitch (lead) and the coefficient of friction of the plastic materials of the threaded element and support member. The above values will yield a pitch angle of about 4.5° for the thread profile of embodiment A and of about 6° for the thread profile of embodiment B. These pitch angles are significantly below the limit of the self-locking angle of the plastic materials of the threaded element and support member.

At this point, it is to be noted that the diameter $D_1$ of the receiving bore 20 of the support member 2 (FIG. 1) is to be adapted, in view of the cutting and deformation characteristics of the material of the support member, to the thread profile such that the external surface 32 of core 8*a* and, respectively, 8*b* (FIGS. 13 to 16) will remain free of any material deformation resulting from the threaded element being threaded into the receiving bore. The counterbore 22 provided at the entrance area of the support member 2 (cf. FIG. 1) is of diameter $D_2$ similar to the major diameter of the thread 11 of the screw 4 (at a tolerance of +0.5 mm) and is of a depth T which is similar to pitch P and is intended to relieve any tensions in the thread entrance area.

Tip Area

Figure 19:
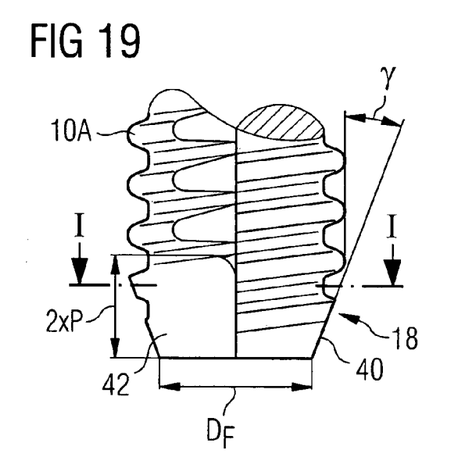
FIG. 19 is a side elevation, partially in section, of the tip area of the embodiment A of a screw of the present invention.
Figure 20:
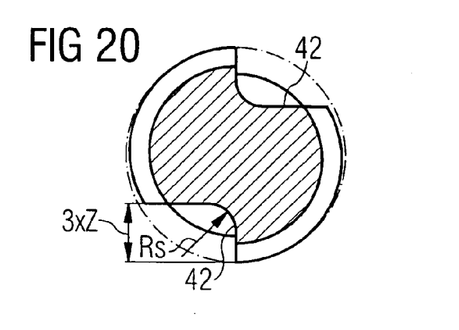
FIG. 20 is a cross-section in the direction of arrows I-I in FIG. 19.
Figure 21:
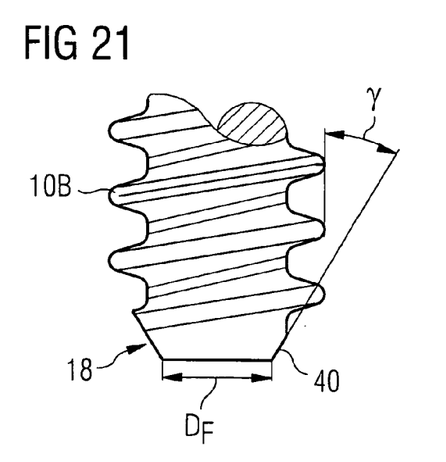
FIG. 21 is a side elevation, similar to FIG. 19, of the embodiment B of a screw of the present invention.

As shown in FIGS. 19 to 21, the screw 4 has, at its axial end remote from the screw head, a conical tip area 18 with a chamfer 40 of a predetermined chamfer angle γ and a minimal diameter $D_F$. Also in this area embodiments A and B of the thread profile have tip areas of different design.

In the embodiment A the chamfer angle γ of the tip area 40 is preferably about 20° and the minimal diameter $D_F$ is about 0.7 times the major diameter $D_A$ of the thread. In the embodiment B the chamfer angle γ is preferably about 30°, and the minimal diameter $D_F$ is preferably about $0.5 \cdot D_A$.

In the embodiment A the tip area 18 preferably includes a chip recess 42 the height of which is 2·P (FIG. 19) and the depth of which is 3·Z (FIG. 20) and which, in the cross-section of FIG. 20, has a radiussed corner of a radius $R_S$. In the embodiment B (FIG. 21) where material deformation is necessary for forming the counter-thread, a chip recess is not required.

It is the tip area 18 which initially engages the material of the support member and therefore initially takes up the load resulting from the cutting or deformation action when the counter-thread is being formed. When the resistance and the stability of the tip area will yield (i.e. the cutting edge will become "blunt"), the following turns of the thread profile having the above cutting geometry will take over the cutting and deformation actions when the threaded element is being threaded into the receiving bore.

Transition Area between the Shaft and the Head of the Screw

Figure 22:
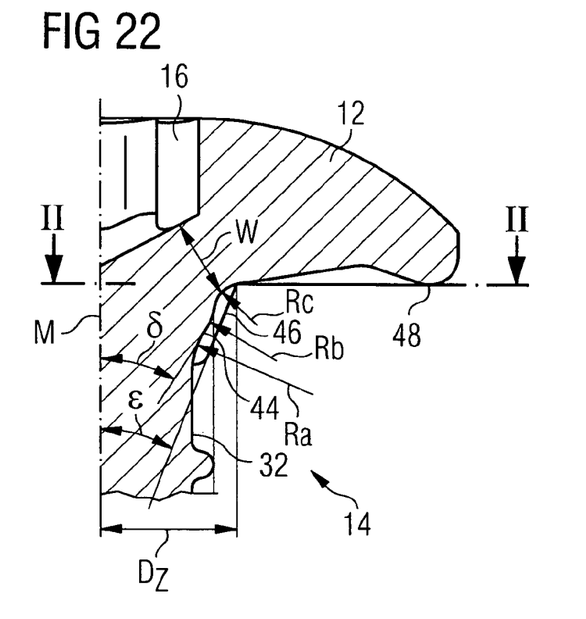
FIG. 22 is a longitudinal section of the transition area between the shaft and the head of a screw of the present invention.
Figure 23:
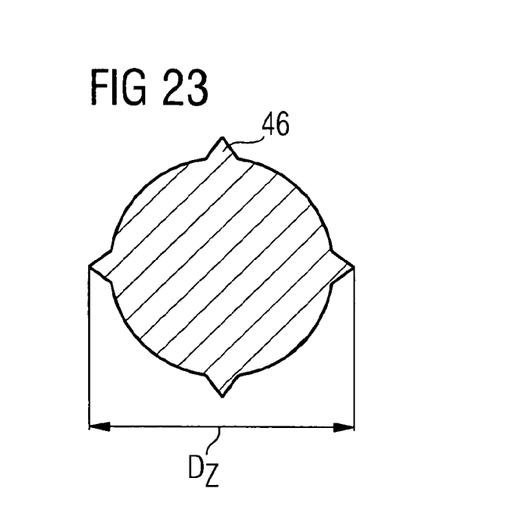
FIG. 23 is a cross-section in the direction of arrows II-II in FIG. 22.

With reference to FIGS. 22 and 23 a preferred design of the transition area 14 between the shaft 10 and the head 12 of the plastic screw 6 will be descrobed. As shown in these figures the external surface 32 of the core 8 of the shaft 10 is joined to the bottom side of the head 12 by a conical surface 44 having radiussed ends of a radius of curvature $R_a$ and, respectively, $R_b$. Radiussed end $R_b$ is followed by a short cylindrical portion which merges into the bottom side of the head 12 by a radiussed portion of a radius of curvature $R_c$. The conical surface 44 is inclined to the central axis M of the screw by an angle δ in the order of 30°.

This generally conical design of the transition area 14 provides for distribution of the tension which will be present in the transition area 14 when the joining assembly 1 is tensioned by tightening the screw. This helps to avoid tension peaks in the transition area 14.

Furthermore, the transition area 14 is of a design such that its wall between the core 8 of the shaft 10 and the head 12 is of a thickness W which is greater than 0.5 times the diameter of the external surface 32 of the core 8. This ensures that plastic material when the screw is being injection molded may readily and smoothly flow into the head area. Furthermore, this design of the transition area, i.e. the relatively large wall thickness W, provides for load distribution when the joining assembly is under tension so as to reduce the risk of fractures in the transition area 14.

As may be seen in FIG. 22 and in particular in FIG. 23, centering ribs 46 disposed in axial planes are provided at the external surface of the transition area 14. The outer edges of the centering ribs 46 are inclined with respect to the central axis M by an angle ϵ of for example 20°. The maximal diameter $D_Z$ of the centering ribs 46 is similar to the diameter $D_3$ of the thru-bore 24 of the structural member 3 (FIG. 1) plus 0.5 mm. As a result the centering ribs 46 engage the peripheral wall of the thru-bore 24 of the structural member 23 when the support member 2 is being joined to the further structural member 3 (FIG. 1). The centering ribs 46 perform both a centering action and a support action for receiving a transverse load when the screw 4 is being threaded into the receiving bore 20.

As shown in FIGS. 1 and 22, the head 12 has a concave bottom surface such that the head 12 engages the upper surface of the structural member 3 along a substantially circular line contact area 48. When the screw 4 is axially loaded, the circular line contact area 48 may penetrate into the softer material of the structural member 3 and/or the head 12 may be deformed due to the elasticity of its material so as to reduce tension peaks which otherwise would result from the axial biassing force, the axial load or thermally caused deformations of the screw.

Material of the Threaded Element

The threaded element (screw or threaded sleeve) is made of a high performance plastic material which is of substantial thermal resistance, substantial stiffness and substantial strength and water resistance. As to the values of these properties, they should be substantially different from those of the plastic material of the support member in order to provide for the desired stability of the thread profile and the cutting geometry during the cutting or deformation work for forming the counter-thread.

Preferred high performance plastic materials for the threaded element are polyphthalamid-GF (PPA-GF); copolyamid on the basis of polyphthalamid-GF; polyetherimid-GF (PEI-GF), polyetheretherketon-GF (PEEK-GF).

Also the following materials may be used: glass fiber reinforced polyamid; carbon fiber reinforced polyphthalamid; carbon fiber reinforced and glass fiber reinforced polyphthalamid; copolyamid on the basis of carbon fiber reinforced polyphthalamid; copolyamid on the basis of carbon fiber reinforced and glass fiber reinforced polyphthalamid; duromeric plastic materials.

It should be understood that these are merely preferred examples of the material of the threaded element; other thermal high performance plastic materials could be used as well.

Threaded Sleeve

As already mentioned the above comments and explanations with respect to the thread profile including the cutting geometry and the tip area relate not only to the screw 4 but also to the threaded sleeve 6.

Examples of the threaded sleeve 6 are shown in FIGS. 7 to 12.

Figure 7:
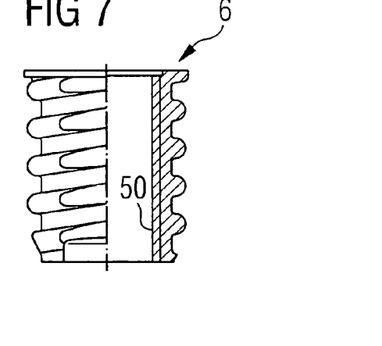
FIG. 7 is a side elevation, partially in section, of a threaded sleeve of the present invention.
Figure 8:
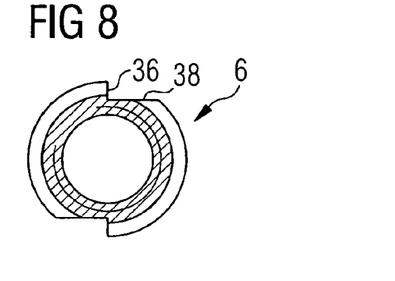
FIG. 8 is a cross-sectional view of the threaded sleeve in FIG. 7.

In the embodiment of FIGS. 7, 8 the threaded sleeve 6 has an internal thread 50 which extends along the total axial length of the threaded sleeve 6. Therefore, the tool for threading the threades sleeve 6 into the receiving bore of the support member must engage the internal thread 50 as will be explained in more detail below.

Figure 9:
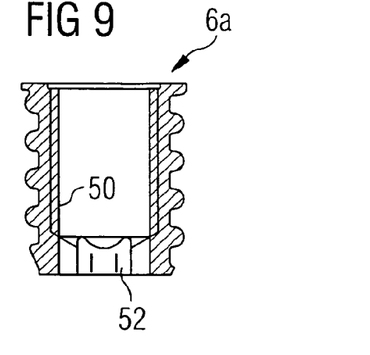
FIG. 9 is a longitudinal cross-section of another embodiment of a threaded sleeve of the present invention.
Figure 10:
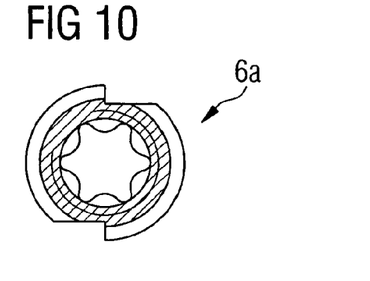
FIG. 10 is a cross-sectional view of the threaded sleeve in FIG. 9.

In the embodiment of FIGS. 9, 10 the threaded sleeve 6a has, additional to the internal thread 50, an internal drive means 52 which, in the example as shown, is an internal rounded hexagon which is provided at only one axial end of the threaded sleeve 6a. As an alternative, an internal polygon could be provided within the internal thread 50 of the threaded sleeve 6a.

Figure 12:
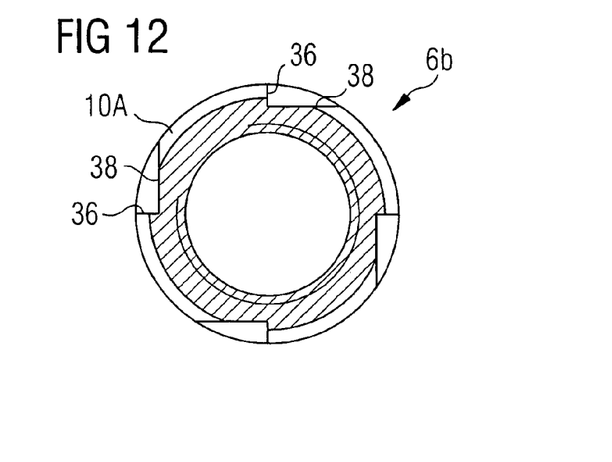
FIG. 12 is a cross-sectional view of the threaded sleeve in FIG. 11.

FIGS. 11 and 12 show a threaded sleeve 6b having an external threaded portion 10A formed as a fine thread. As explained above in connection with the thread profile, the fine thread 10A results from using the preferred thread profile of an embodiment A or B and increasing the major diameter $D_A$ correspondingly.

As mentioned above, the threaded sleeve 6b of FIGS. 11, 12 is composed of four radially offset angular segments so as to provide for four cutting edges 36. In the embodiment as shown the cutting edges 36 are associated to four chip grooves 38. The greater number of cutting edges 36 provides for improved circumferential distribution of the cutting force and improved alignment of the threaded sleeve within the receiving bore.

The threaded sleeve is inserted into the cylindrical (molded or machined) receiving bore of the support member which may be a plastic form part of low strength. When the plastic form part is manufactured by injection molding, no complex operation to remove the thread from the mold is required. Therefore, the threaded sleeve made of high performance plastic material enhances the functional capabilities and characteristics of the plastic form part due to its highly resistant thread.

The internal thread 50 of the threaded sleeve 6 or 6a or 6b may be specially designed to provide for a thread retention effect, for example by using a pitch offset, a diameter change, or by a partially thread-free area in order to clamp a screw (not shown) within the internal thread of the threaded sleeve.

Assembly Tool

Figure 24:
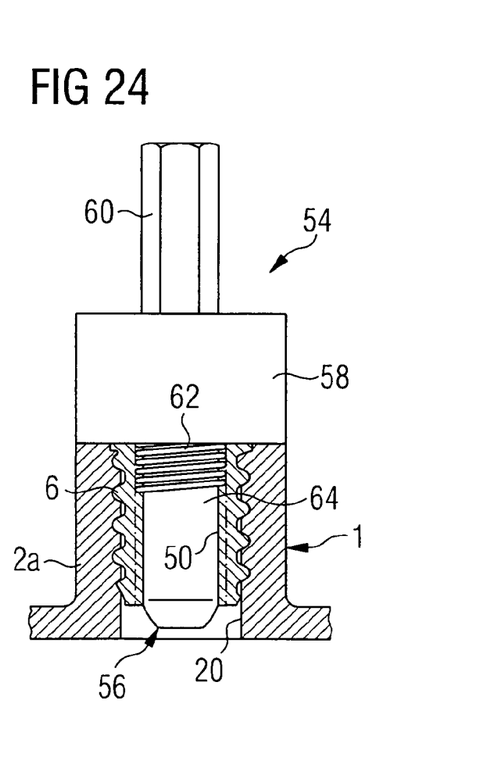
FIG. 24 is a side elevation, partially in section, of a tool for making a joining assembly of a threaded sleeve and a support member.

The tool shown in FIG. 24 is adapted to insert a threaded sleeve 6 as shown in FIGS. 7 and 8 into the receiving bore 20 of a support member 2a which is a plastic form part. The tool comprises a drivingly rotatable tool body 54 which includes an axially extending mandrel 56, an adjacent abutment portion 58 of increased diameter, and an adjacent drive portion 60. The mandrel 56 is an axial pin including a relatively short threaded portion 62 adjacent the abutment portion 58, and an adjacent cylindrical support portion 64. The thread of the threaded portion 62 is matingly shaped with respect to the internal thread 50 of the threaded sleeve 6 while the diameter of the cylindrical support portion 64 is similar to the minor diameter of the internal thread 50.

During assembly the threaded sleeve 6 is "threaded" upon the short threaded portion 62 until the threaded sleeve 6 engages the abutment portion 58. The threaded sleeve 6 may then be rotated by means of the tool body 54 so as to be threaded into the receiving bore 20. During this operation the cylindrical portion 64 of the mandrel 56 supports the threaded sleeve 6 from inwards. When the abutment portion 58 engages the support member 1, the assembling operation is completed. The mandrel 56 will now be withdrawn by rotating the tool body 54 in the opposite direction. Due to the short length of the threaded portion 62 the inserting and removing operations can be performed very quickly.

Figure 25:
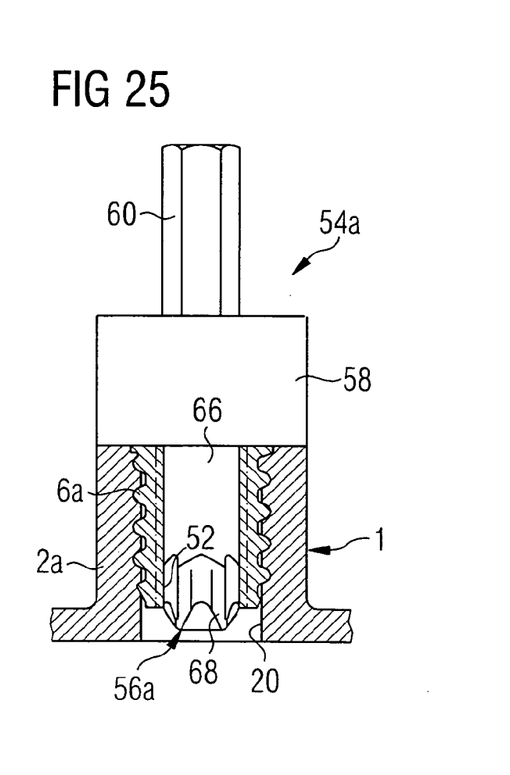
FIG. 25 is a side elevation, similar to FIG. 24, of another embodiment of a tool for making a joining assembly of a threaded sleeve and a support member.

The tool shown in FIG. 25 is adapted to assemble a threaded sleeve 6a as shown in FIGS. 9 and 10 and provided with an internal drive means 52. Again the tool comprises a drivingly rotatable tool body 54*a* including a mandrel 56*a*, an abutment portion 58, and a drive portion 60. In this case, however, the mandrel 56*a* is a pin without any threads and including a cylindrical portion 66 and a drive portion comprising a drive means 68 matingly shaped with respect to the internal drive means 52 of the threaded sleeve 6*a*.

This tool enables a simplified assembling operation because the threaded sleeve 6*a*, at the beginning of the assembling operation, merely is to be slid axially upon the mandrel 56*a*, and the mandrel 56*a* can be just withdrawn axially from the threaded sleeve 6*a* at the end of the assembling operation.

A further advantage of the tool of FIG. 25 is that it enables the threaded sleeve 6*a* to be axially displaced within the receiving bore after the assembling operation. Therefore, the axial position of the threaded sleeve 6*a* may be finely adjusted such that the threaded sleeve 6*a* may be set so as to project axially from the receiving bore 20 for a predetermined amount in order to engage a counter-surface (not shown).

Method for Making a Non-Releasable Joining Assembly by Friction Welding

As explained above the threaded element (screw or threaded sleeve) may be inserted into the cylindrical receiving bore of the support member by a simple threading operation. There will result a joining assembly 1 which allows to remove the threaded element from the receiving bore by an "unthreading" operation.

According to a further aspect of the present invention the plastic threaded element may be inserted into the receiving bore of the support member in a manner such that a non-releasable, gas- and liquid-tight joint between the threaded element and the support member will result.

To this end the threaded element (plastic screw or plastic threaded sleeve) is being threaded into cylindrical receiving bore of the support member at such a high speed that the plastic material of the support member which is a high-performance glass fiber reinforced thermoplastic material is plastified by frictional heat. The external thread of the threaded element will displace the plastified plastic material of the support member in a direction opposite to the threading direction. This plastified plastic material when solidified will encapsulate the external thread of the threaded element. At the end of the threading operation the speed of the tool will be abruptly reduced to zero. Otherwise the structure of the encapsulation of the threaded element might be destroyed so that the enclosure would not be fluid-tight. Due to the different properties, i.e. the different melting points of the plastic materials of the threaded element and the support member, the threaded element will not be damaged. This "rotational friction welding" enables assembly durations of less than 2 sec.

I claim:

1. A joining assembly comprising:
   a support member of plastic material,
   said support member having a receiving bore defined by a bore wall, and
   a threaded element of plastic material and having a central axis (M), said threaded element comprising a core and an external threaded portion which, when the threaded element is threaded into the wall of said receiving bore of the support member, forms an internal threaded portion in said receiving bore by a cutting and/or deforming operation,
   said threaded element comprising a plurality of angular segments which, in radial planes, are of arcuate peripheries having centers of curvature (Ma, Mb) radially offset with respect to said central axis (M) such that adjacent angular segments are offset at their peripheries by steps so as to provide cutting edges to perform a cutting operation when said threaded element is threaded into the receiving bore of the support member,
   wherein the centers of curvature (Ma, Mb) of the arcuate peripheries of the angular segments are offset to the central axis (M) of the threaded element in opposite radial directions by an amount X as follows:
   X=0.10 mm for $D_{Nenn} \leq 8$ mm
   X=0.15 mm for $D_{Nenn} < 8$ mm and $D_{Nenn} \leq 12$ mm
   X=0.20 mm for $D_{Nenn} < 12$ mm
   wherein $D_{Nenn}$ is twice the radius of curvature (R) of the arcuate peripheries of the thread of the angular segments.

2. The joining assembly of claim 1 wherein said external threaded portion of said threaded element comprising a thread extending for a plurality of revolutions and being, in an axial cross-section, of a profile having straight flanks which are joined by a rounded crest,
   the core of said threaded element having, between the revolutions of the thread, a helically extending surface of uniform diameter which, in an axial cross-section, is joined to the flanks of the thread by rounded corners,
   the revolutions of the thread defining therebetween a helical gap of a volume exceeding that of the thread, and
   wherein the profile of said thread of said external threaded portion is
   $P=(0.16$ to $0.9) \cdot D_A$
   $Z=(0.15$ to $0.5) \cdot P$
   $R1=(0.4$ to $0.7) \cdot Z$
   $R2=(0.2$ to $0.5) \cdot Z$
   wherein P is the pitch of the thread, Z is the profile height of the thread, R1 is the radius of curvature of the rounded crest, R2 is the radius of curvature of the rounded corners between said cylindrical external surface of the core and the flanks of the thread, and $D_A$ is the major diameter of the thread,
   wherein said support member is of a material which requires substantially a cutting operation for forming said internal threaded portion.

3. The joining assembly of claim 2, wherein the flanks of the thread include a profile angle ($\alpha$) of 30° to 50°.

4. The joining assembly of claim 3, wherein the flanks of the thread include a profile angle ($\alpha$) of about 40°.

5. The joining assembly of claim 2, wherein P, Z, R1 and R2 have the following preferred values:
   $P=0.25 \cdot D_A$
   $Z=0.38 \cdot P$
   $R1=0.6 \cdot Z$
   $R2=0.35 \cdot Z$ 6. The joining assembly of claim 5 having an increased major diameter $D_A$ and a decreased diameter ratio $P/D_A$ for providing a fine thread.

7. The joining assembly of claim 2, wherein said external threaded portion comprises a plurality of threads of an increased diameter ratio $P/D_A$.

8. The joining assembly of claim 2, wherein the receiving bore of the support member has a counterbore of a diameter (D2) at least as large as a major diameter ($D_A$) of the thread of the threaded element.

9. The joining assembly of claim 2, wherein the receiving bore of the support member has a diameter (D1) adapted to the thread of the threaded element such that said external surface of the core of the threaded element between the threads of the threaded element will not be subject to any deforming action when said internal threaded portion is being formed.

10. The joining assembly of claim 2, wherein the threaded element has an axial free end provided with a conical tip area having a cutting chamfer of a predetermined chamfer angle ($\gamma$) and a predetermined cutting diameter ($D_F$).

11. The joining assembly of claim 10 for a support member of a material which requires substantially a cutting operation for forming said internal threaded portion, wherein said chamfer angle ($\gamma$) of the cutting chamfer is about 20° and said cutting diameter ($D_F$) is about 0.7 times the major diameter ($D_A$) of the thread.

12. The joining assembly of claim 11, wherein said tip area is provided with a chip recess of a height which is about two times the pitch (P) of the thread, and of a depth which is substantially three times the profile height (Z) of the thread.

13. The joining assembly of claim 2, wherein said threaded element is a screw comprising a shaft and a head.

14. The joining assembly of claim 13, wherein said external surface of the core of the threaded element is joined to said head by a transition area comprising a conical outer surface having radiussed end portions ($R_a$, $R_b$).

15. The joining assembly of claim 14, wherein said transition area between the core of the threaded element and the head is of a wall thickness (W) which exceeds half the diameter of said external surface of the core.

16. The joining assembly of claim 14, wherein said transition area has an outer surface between said shaft and said head which is provided with centering ribs disposed in axial planes and engaging a wall of a thrubore of a further member when said support member is joined to said further member by said threaded element.

17. The joining assembly of claim 14, wherein said head of said screw has a concave bottom face of a shape such that said head provides for a substantially circular line contact in a radially outer area thereof.

18. The joining assembly of claim 2, wherein said threaded element is made of a highly resistant plastic material that is a polyphthalamid-GF (PPA-GF), or a copolyamid on the basis of polyphthalamid-GF, or polyetherimid-GF (PEI-GF), or polyetheretherketon-GF (PEEK-GF), or fiber glass reinforced polyamid, or carbon fiber enforced polyphthalamid, or carbon fiber reinforced and glass fiber reinforced polyphthalamid, or copolyamid on the basis of carbon fiber reinforced polyphthalamid, or copolyamid on the basis of carbon fiber reinforced and glass fiber reinforced polyphthalamid, or a duroplastic material.

19. A threaded element for a joining assembly as defined in claim 2, said threaded element being a screw.

20. The joining assembly of claim 1, wherein said arcuate peripheries of the thread of the angular segments and a virtual circumscribing circle (K) having a center at the central axis (M) of the threaded element include a clearance angle ($\beta$).

21. The joining assembly of claim 20, wherein said clearance angle ($\beta$) is 0.5° to 5°.

22. The joining assembly of claim 20, wherein said clearance angle ($\beta$) is 0.5° to 2°.

23. The joining assembly of claim 1 for support members of a material which requires substantially a cutting operation for forming said internal threaded portion, wherein the thread of the angular segments each is provided with a chip groove extending along a length of the threaded element and being arranged so as to elongate an associated one of said cutting edges.

24. The joining assembly of claim 1 for support members of a material which requires substantially a deforming operation for forming said internal threaded portion, wherein the tread of the angular segments does not include any chip grooves.

25. The joining assembly of claim 1 for a support member of a material which requires substantially a deforming operation for forming said internal treaded portion, wherein said external threaded portion of said threaded element comprising a thread extending for a plurality of revolutions and being, in an axial cross-section, of a profile having straight flanks which are joined by a rounded crest, the core of said threaded element having, between the revolutions of the thread, a helically extending surface of uniform diameter which, in an axial cross-section, is joined to the flanks of the thread by rounded corners, the revolutions of the thread defining therebetween a helical gap of a volume exceeding that of the thread, and wherein the profile of the thread of the external threaded portion is defined as follows:

$P=(0.25 \text{ to } 0.9) \cdot D_A$
$Z=(035 \text{ to } 0.65) \cdot P$
$R1=(025 \text{ to } 0.5) \cdot Z$
$R2=(0.25 \text{ to } 0.5) \cdot Z$ wherein P is the pitch of the thread, Z is the profile height of the thread, R1 is the radius of curvature of the rounded crest, R2 is the radius of curvature of the rounded corners between said cylindrical external surface of the core and the flanks of the thread, and $D_A$ is the major diameter of the thread.

26. The joining assembly of claim 25 wherein P, Z, R1 and R2 have the following preferred values:

$P=0.33 \cdot D_A$
$Z=0.55 \cdot P$
$R1=0.3 \cdot Z$
$R2=0.3 \cdot Z$.

* * * * *

UNITED STATES PATENT AND TRADEMARK OFFICE
CERTIFICATE OF CORRECTION

| | |
|---|---|
| PATENT NO. | : 7,658,581 B2 |
| APPLICATION NO. | : 11/119247 |
| DATED | : February 9, 2010 |
| INVENTOR(S) | : Rainer Süßenbach |

It is certified that error appears in the above-identified patent and that said Letters Patent is hereby corrected as shown below:

Column 12 line 10 "<8 mm" should be ">8 mm".

Column 12 line 11 "<12 mm" should be ">12 mm".

Column 14 line 17 "tread" should be "thread".

Column 14 line 27 "treaded" should be "threaded".

Signed and Sealed this

Twentieth Day of April, 2010

David J. Kappos
*Director of the United States Patent and Trademark Office*